US008326579B2

(12) United States Patent
Wilson et al.

(10) Patent No.: US 8,326,579 B2
(45) Date of Patent: Dec. 4, 2012

(54) METHOD AND SYSTEM FOR PROGRAM EXECUTION INTEGRITY MEASUREMENT

(75) Inventors: Perry W. Wilson, Laurel, MD (US); J. Aaron Pendergrass, Silver Spring, MD (US); C. Durward McDonell, III, Olney, MD (US); Peter A. Loscocco, Glenwood, MD (US); David J. Heine, Columbia, MD (US); Bessie Y. Lewis, Owings Mills, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 13/040,622

(22) Filed: Mar. 4, 2011

(65) Prior Publication Data

US 2011/0202313 A1    Aug. 18, 2011

Related U.S. Application Data

(63) Continuation of application No. 11/743,284, filed on May 2, 2007, now Pat. No. 7,904,278.

(60) Provisional application No. 60/796,694, filed on May 2, 2006.

(51) Int. Cl.
*G21C 17/00* (2006.01)
(52) U.S. Cl. ..................... 702/186; 714/38.1; 717/126
(58) Field of Classification Search .................. 702/108, 702/123, 127, 186; 714/37, 38.1, 38.14; 726/22; 717/124, 126
See application file for complete search history.

(56) References Cited

U.S. PATENT DOCUMENTS

| | | | |
|---|---|---|---|
| 6,898,784 B1 * | 5/2005 | Kossatchev et al. | 717/126 |
| 7,159,237 B2 | 1/2007 | Schneier et al. | |
| 2003/0188227 A1 | 10/2003 | Maison et al. | |
| 2004/0123137 A1 * | 6/2004 | Yodaiken | 713/200 |
| 2006/0061355 A1 | 3/2006 | Wendling et al. | |
| 2006/0101310 A1 * | 5/2006 | Diamant et al. | 714/38 |
| 2006/0179483 A1 | 8/2006 | Rozas | |
| 2006/0236122 A1 * | 10/2006 | Field et al. | 713/187 |

OTHER PUBLICATIONS

T. Fraser, Automatic discovery of integrity constraints in binary kernel modules. Technical report, University of MD Institute for Advancedd Computer Studies, Dec. 2004; pp. 1-13.
R. Sailer, Design and Implementation of a TCG-based Integrity Measurement Architecture, IBMT.J. Watson Resrch. Cntr., Proceedings of the 13th USENIX Assoc.,San Diego,CA,Aug. 2004.
N. Petroni, Jr. et al., Copilot—a Coprocessor-based kernel Runtime Integrity Monitor, University of MD, Proceedings of the 13th USENIX Assoc., San Diego, CA, Aug. 9-13, 2004.

* cited by examiner

*Primary Examiner* — Manuel L Barbee
(74) *Attorney, Agent, or Firm* — Noah J. Hayward

(57) ABSTRACT

The present disclosure is directed towards methods and systems and methods for measuring the integrity of an operating system's execution and ensuring that the system's code is performing its intended functionality. This includes examining the integrity of the code that the operating system is executing as well as the data that the operating system accesses. Integrity violations can be detected in the dynamic portions of the code being executed.

3 Claims, 8 Drawing Sheets

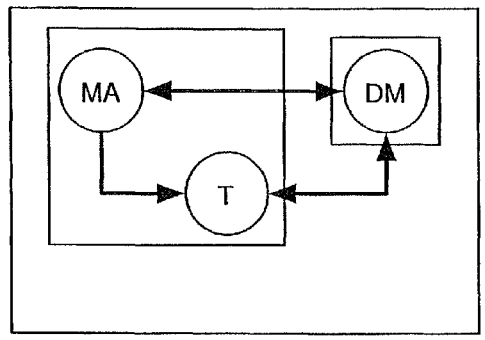
FIGURE 1(a)
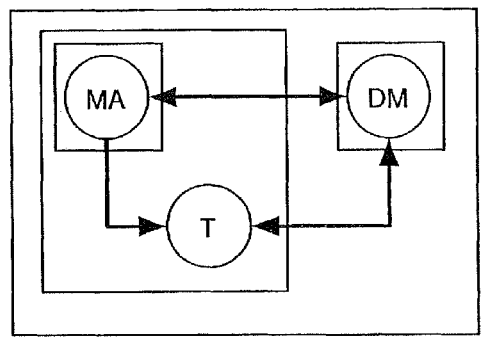
FIGURE 1(b)
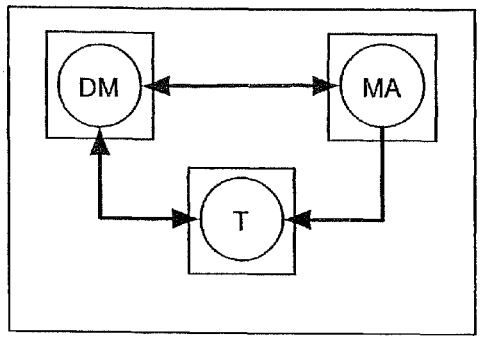
FIGURE 1(c)
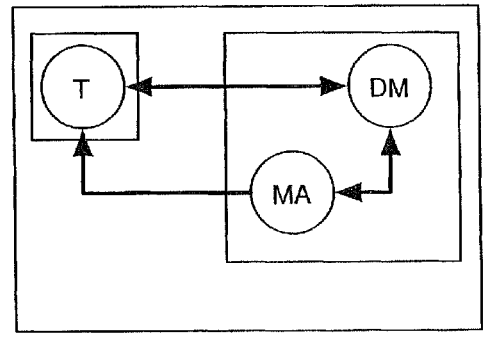
FIGURE 1(d)
FIGURE 1

- <u>Static Memory Regions</u>
  - Result: stext [c0102000]:
    sha1: 34fb210a340248c235c65778f94922620556464c
  + Result: cpu_gdt_table [c02f0280]:
  + Result: sys_call_table [c02bc48c]:
+ <u>System Call Table inspection</u>
- <u>Virtual File System Inspection</u>
  + Result: super_blocks [c02f72c4]:
  + Result: inode_in_use [c02f79e4]:
+ <u>Block IO Inspection</u>
- <u>Binary File Formats</u>
  - Result: formats [c0373808]:
    - Result: formats[0] [c02f8288]:
      - Result: elf_format [c02f8288]:
        load_elf_binary [c018218c]
        load_elf_library [c0181e1a]
        elf_core_dump [c018398a]
    + Result: formats[1] [c02f8270]:
    + Result: formats[2] [c02f8020]:
+ <u>Networking</u>
+ <u>SELinux</u>

FIGURE 6(b)

METHOD AND SYSTEM FOR PROGRAM EXECUTION INTEGRITY MEASUREMENT

CROSS REFERENCE TO RELATED APPLICATIONS

This application is a continuation of U.S. patent application Ser. No. 11/743,284, filed May 2, 2007, issued as U.S. Pat. No. 7,904,278 on Mar. 8, 2011, which claims the benefit of U.S. provisional application: Ser. No. 60/796,694, filed on May 2, 2006, the entire contents of each being hereby incorporated by reference herein in its entirety.

STATEMENT OF GOVERNMENTAL INTEREST

This invention was made with Government support under Department of Defense contract MDA904-02-D-0302. The Government has certain rights in the invention.

BACKGROUND OF THE INVENTION

1. Field of the Invention

The present invention relates generally to integrity measurement and, more particularly, to methods and system to verify the integrity of a software-based computer system.

2. Description of the Related Art

The computer industry has shown increased interest in leveraging integrity measurements to gain more confidence in general purpose computing platforms. The concern regarding this trend is that the approach to integrity measurement promoted by new security technologies has yet to sufficiently mature for realization of integrity measurement's potential security impact.

In the general sense, measurement is a process of characterizing software. There are any number of ways in which the same piece of software could be characterized, each potentially resulting in a different measurement technique. The reasons for measuring a piece of software are varied, with some measurement techniques being more appropriate than others.

One common technique is hashing. A hash is computed over static regions of the software and used as the characterization. Although hashes are easily computed, stored and used, hashing is by no means the only possible measurement technique. Existing measurement systems tend to rely on hashes of security relevant objects such as the BIOS, the executable code of an operating system, or the contents of configuration files. Hashing is extremely effective as a measurement technique in certain circumstances. However, hashing does not always produce results that allow a complete determination of integrity.

A fundamental property of an Integrity Measurement System (IMS) is the use of measurement data as supporting evidence in decisions about the integrity of a target piece of software. An ability to produce accurate assessments of software integrity allows an IMS to contribute significantly to security in many scenarios. Without measurement techniques appropriate to the decision for a given scenario, an IMS cannot correctly determine integrity.

For example, to the user of a system, an IMS could help determine if the system is in a sufficiently safe state to adequately protect data. It could help determine the pedigree of the provider of a service or software, as well the software itself. An Information Technology (IT) department could benefit from an IMS to help ensure that systems connected to its network are indeed in some approved configuration. To a service provider, an IMS enables decisions about granting a particular service to include statements about the integrity of the requesting system and/or application. In each of these scenarios, the reasons for needing an integrity decision, as well as the type of measurement data suitable for that decision might be different.

There are multiple ways in which an IMS architecture could be implemented, four of which are shown in FIG. 1. They share several common elements: a measurement agent (MA), a target of measurement (T), and a decision maker (DM). An MA collects measurement data about T using some appropriate measurement technique. The MA needs to have access to T's resources and be able to hold the measurement data until needed. The DM acts as a validator or appraiser responsible for interpreting measurement data in support of integrity decisions. In an IMS that uses hashing for measurement, this component would likely be responsible for comparing hashes to known good values. Lastly, an IMS must have a means of presenting collected data to a DM. Depending on the implementation, this could be as simple as displaying measurements to a user or administrator, but more complex systems require protocols for communicating the authenticity and integrity of measurement data to the DM.

One common notion of an IMS has the MA and T co-resident on the user's platform, while the DM runs on a separate machine controlled by the owner. Measurement data is transferred to the DM using an attestation protocol. However, it should be noted that many other possible layouts for an IMS are also appropriate.

When designing an IMS to meet the needs for any given scenario, how the above-mentioned components are integrated into the system, as well as properties of each of them, can greatly impact the effectiveness of the system's ability to provide the quality of measurement data necessary for the DM to provide desired security benefits. These design choices also impact the ability of a given IMS to support multiple scenarios for the same platform. The design of an IMS tailored to a specific scenario is likely to differ greatly from one intended to serve a more general purpose. Considering an IMS in terms of these component pieces yields different dimensions by which an IMS can be evaluated.

The use of an IMS raises privacy concerns. Owners of measurement targets may be hesitant to release certain types of measurements to a DM for a variety of valid reasons. IMS component design impacts an IMS's ability to adequately address privacy concerns.

Measurement deals with what might be described as expectedness. Eventually a decision will be needed to determine if the software relied upon for a critical function is indeed the expected version that was previously determined to be trustworthy to perform the function and is either in a known good state or perhaps not in a known bad state. A suitable measurement process must produce data sufficient for an IMS to make this determination.

In order to assess the sufficiency of any measurement process, the measurement data's intended purpose must be understood. A technique deemed sufficient for one measurement scenario might prove completely inadequate for another. An IMS's DM and how it relies on integrity evidence for security will ultimately determine if a given measurement technique is suitable.

Integrity measurements are evidence to be used in decisions relevant to the execution of a piece of software or some other software that depends on it. These decisions require an assessment of software state and perhaps its environment. Since any such decision's validity will rely on the quality of the evidence, where quality is reflected in terms of how accurately the measurement data characterizes those portions of the software relevant to the pending decision, it is useful to consider integrity measurement techniques based on their potential to completely characterize a target irrespective of scenario or system. Techniques with greater potential for complete characterization should be considered better suited for decision processes requiring a true measure of integrity.

Besides understanding a measurement process' ability to characterize the target, there are other characteristics of an IMS's MA useful for examining its sufficiency for producing adequate evidence of a target's expectedness. Among them are a MA's ability to produce all evidence required by the IMS's DM and to reflect in that evidence the current state of the potentially executing target.

In order to discuss integrity measurement systems, it is necessary to have a common measurement vocabulary. With a suitable vocabulary, it becomes possible to assess and compare measurement techniques to determine their suitability in a given IMS for particular measurement scenarios. It would also be useful for describing how the different components of an IMS have been integrated to meet functional and security requirements.

There are six properties of the measurement component of an IMS to serve as the beginnings of such a vocabulary. They provide several dimensions that have proven useful not only to assess and compare existing IMS but have also helped motivate the design of new IMS. These are not the only dimensions in which IMS could be discussed, and these properties are not intended to be canonical. They do, however, form a good framework for discussions about important aspects of IMS. The measurement component of an IMS should:

Produce Complete results. An MA should be capable of producing measurement data that is sufficient for the DM to determine if the target is the expected target as required for all of the measurement scenarios supported by the IMS.

Produce Fresh results. A MA should be capable of producing measurement data that reflects the target's state recently enough for the DM to be satisfied that the measured state is sufficiently close to the current state as required for all of the measurement scenarios supported by the IMS.

Produce Flexible results. A MA should be capable of producing measurement data with enough variability to satisfy potentially differing requirements of the DM for the different measurement scenarios supported by the IMS.

Produce Usable results. A MA should be capable of producing measurement data in a format that enables the DM to easily evaluate the expectedness of the target as required for all of the measurement scenarios supported by the IMS.

Be Protected from the target. An MA should be protected from the target of measurement to prevent the target from corrupting the measurement process or data in anyway that the DM cannot detect.

Minimize impact on the target. An MA should not require modifications to that target nor should its execution negatively impact the target's performance.

Tripwire (G. Kim and E. Spafford, The Design and Implementation of Tripwire: A File System Integrity Checker. Purdue University, November 1993) was an early integrity monitoring tool. It allowed administrators to statically measure systems against a baseline. Using Tripwire enables complete integrity measurement of file system objects such as executable images or configuration files. These measurements, however, cannot be considered complete for the runtime image of processes. Tripwire provides no indication that a particular file is associated with an executing process, nor can it detect the subversion of a process.

Tripwire performs well with respect to freshness of measurement data, and the impact on the target of measurement. Remeasurement is possible on demand, enabling the window for attack between measurement collection and decision making to be quite small. Since Tripwire is an application, installation is simple and its execution has little impact on the system. But because it is an application, the only protection available is that provided by the target system, making Tripwire's runtime process and results vulnerable to corruption or spoofing.

Tripwire is also limited with respect to flexibility and usability. Decision makers may only base decisions on whether or not a file has changed, not on the way in which that file has changed. Tripwire cannot generate usable results for files which may take on a wide variety of values. These limitations are generally characteristic of measurement systems that rely on hashes, making them most effective on targets not expected to change.

IMA (R. Sailer, X. Zhang, et al., Design and implementation of a TCG-based integrity measurement architecture, Proceedings of the 13th Usenix Security Symposium, pages 223-238, August 2004) and systems like Prima (T. Jaeger, R. Sailer, and U. Shankar, Prima: Policy-reduced integrity measurement architecture, SACMAT'06: Proceedings of the Eleventh ACM Symposium on Access Control Models and Technologies, 2006) which build upon its concepts appear very similar to Tripwire when considered with respect to the described properties, but they do offer significant improvements. IMA's biggest advance is the protection of the measurement system and its data. Because it is a kernel module rather than user-land process, it is immune to many purely user-space attacks that might subvert the Tripwire process. However, it is still vulnerable to many kernel-level attacks. Subversion of IMA's measurement results is detectable by comparing a hash value stored in the TPM with the expected value generated from the measurement system's audit log.

IMA makes more complete measurements of running processes than Tripwire because IMA is able to associate running processes with the recorded hash values. However, results only reflect static portions of processes before execution begins. Because no attempt is made to capture the current state of running processes, fresh measurements cannot be provided to any decision process requiring updated measurements of the running process.

PRIMA extends the IMA concept to better minimize the performance impact on the system. By coupling IMA to SELinux policy (P. Loscocco and S. Smalley, Integrating flexible support for security policies into the linux operating system, Proceedings of the FREENIX Track, June 2001) the number of measurement targets can be reduced to those that have information flows to trusted objects. This may also aid completeness in that measurement targets can be determined by policy analysis. The requirement for trusted applications to be PRIMA aware and required modifications to the operating system are development impacts on the target.

CoPilot (N. Petroni, Jr., T. Fraser, et al., Copilot—a coprocessor-based kernel runtime integrity monitor, Proceedings of the 13th Usenix Security Symposium, pages 179-194, August 2004) pushes the bar with respect to completeness, freshness and protection. Cryptographic hashes are still used to detect changes in measured objects, but unlike other systems, CoPilot's target of measurement is not the static image of a program and configuration files but the memory image of a running system. It also attempts to verify the possible execution paths of the measured kernel. The ability to inspect the runtime memory of the target is an improvement over file system hashes because it enables decisions about runtime state. Protection from the target is achieved by using a physically separate processing environment in the form of a PCI expansion card with a dedicated processor.

Although a considerable advance, CoPilot fails as a complete runtime IMS in two key ways. It cannot convincingly associate hashed memory regions with those actually in use by the target. It can only measure static data in predefined locations; dynamic state of the target is not reflected. The requirement of additional hardware in the target environment also impacts the target.

Other measurement systems have been developed. Unlike those discussed so far, some use computations on or about the target system rather than employ a more traditional notion of measurement such as hashing. One such system is Pioneer (A. Seshardri, M. Luk, et al., Pioneer:Verifying code integrity and enforcing untampered code execution on legacy systems, ACM Symposium on Operating Systems Principles, October 2005). It attempts to establish a dynamic root of trust for measurement without the need of a TPM or other hardware enhancements. The measurement agent is carefully designed to have a predictable run time and an ability to detect preemption. The measurement results can be fresh but are far from a complete characterization of the systems. Although in theory, this approach could support more complete measurement as long as the property of preemption detection is preserved.

Pioneer was designed to detect attempts of the target to interfere with the measurement agent, but it requires a difficult condition that the verifier to be able to predict the amount of time elapsed during measurement. The impact on the target system can also be great because in order to achieve the preemption detection property, all other processing on the target has to be suspended for the entire measurement period.

Semantic integrity is a measurement approach targeting the dynamic state of the software during execution therefore providing fresh measurement results. Similar to the use of language-based virtual machines for remote attestation of dynamic program properties (V. Haldar, D. Chandra, and M. Franz, Semantic remote attestation—a virtual machine directed approach to trusted computing, Proceedings of the $3^{rd}$ USENIX Virtual Machine Research & Technology Symposium, May 2004), this approach can provide increased flexibility for the challenger. If the software is well understood, then semantic specifications can be written to allow the integrity monitor to examine the current state and detect semantic integrity violations. This technique alone will not produce complete results as it does not attempt to characterize the entire system, but it does offer a way in which integrity evidence about portions of the target not suitable for measurement by hashing can be produced.

Such an approach has been shown effective in detecting both hidden processes and SELinux access vector cache inconsistencies in Linux (N. Petroni Jr., T. Fraser, et al., An architecture for specification-based detection of semantic integrity violations in kernel dynamic data, Security '06: 15th USENIX Security Symposium, 2006). A very flexible system was produced that can be run at anytime to produce fresh results and that is easily extended to add new specifications. Better completeness than is possible from just hashing is achieved since kernel dynamic data is measured, but no attempt was made to completely measure the kernel. Completeness can only come with many additional specifications. Like CoPilot, a separate hardware environment was used to protect the measurement system from the target and to minimize the impact on the target at the cost of having extra hardware installed. However, it is subject to the same limitations as CoPilot.

SUMMARY OF THE INVENTION

Therefore, the present invention has been made in view of the above problems, and it is an objective of the present invention to provide methods and system for verifying the integrity of a software-based computer system.

In accordance with one aspect of the present invention, the afore-mentioned objective is achieved by providing a method for measuring and verifying the integrity of a computer program, the computer program comprising a plurality of modules, each module comprising a plurality of data objects comprising static and dynamic objects, the method comprising the steps of:

identifying the plurality of data objects using a plurality of attributes relevant to the computer program integrity to produce a baseline of the plurality of data objects from a stored image of the computer program;

measuring an image of the computer program in a memory without modifying the computer program to produce a measurement manifest comprising the steps of:

inspecting the identified plurality of data objects;
  generating an object graph for each data object; and
  using the object graphs to produce the measurement manifest; and comparing the baseline and the measurement manifest to verify the integrity of the computer program.

In accordance with another aspect of the present invention, the afore-mentioned objective is achieved by inserting an alert to trigger the computer program whose integrity has been verified to independently measure and verify the integrity of a new module before the new module is loaded into a memory.

In accordance with another aspect of the present invention, the afore-mentioned objective is achieved by providing a method for measuring and verifying the integrity of a computer program and modules being loaded from a stored location into a memory comprising the steps of: calculating an image of the computer program in the memory using an image of the computer program in the stored location, the relevant runtime information and knowledge of how the computer program will be loaded into the memory; comparing an image of the computer program in the memory with the calculated image of the computer program in the memory; and using the comparison to verify the integrity of the computer program in the memory.

In accordance with another aspect of the present invention, the afore-mentioned objective is achieved by providing a method for graphing data representing an integrity measurement of a computer program, the method comprising the steps of: decomposing the integrity measurement into a plurality of distinct measurement classes, each measurement class representing a semantically related grouping of variables which have been examined to produce a characterization of an isolated subset of the computer program's state; and connecting to each measurement class a structured representation of the measurement of those objects which contribute to the overall measurement of that class.

Program execution integrity is an inventive approach for measurement and verification of computer program integrity. The unique features include: dynamic data inspection, event triggers, and a manifest of results. Data objects are inspected during runtime to provide an increased level of confidence in the integrity of the running program. False integrity failures due to dynamic changes at runtime are prevented via runtime monitoring and triggers inserted into program code. Measurement results are time-stamped and stored in a manifest.

Data objects are identified by security relevant attributes: state values, function pointers, and references to other objects. Static objects are located by the address assigned at compile time. Measurement begins by inspecting the static objects of interest, which include containers of dynamic objects. References found in objects being inspected reveal other dynamic objects. The object graph, with state information and function pointers for each node, are captured in the measurement manifest. The fine granularity of results facilitates partial re-measurement and flexible policy enforcement during verification.

To support dynamic module loading, a trusted computer program responds to triggers by verifying modules and updating the measurement baseline. This fail-safe approach is designed to prevent false failures of integrity checks without impacting the capability of detecting the insertion of foreign program code. The program triggers the monitor before loading a new module. The monitor independently verifies the integrity of the new code before it is loaded into memory. The security relevant attributes of the module are computed based upon the image stored on disk and its target location in memory. These trusted attributes are entered in the baseline and the static objects of the new module are added to the list of items being measured.

The effectiveness of this approach has been demonstrated in a Linux Kernel Integrity Monitor (LKIM) embodiment. LKIM baselines the built-in operation structures from a kernel image on disk. It measures a kernel image in memory without the need to modify the existing kernel. The baseline and measurement processes each produce a textual form that can be used to verify a runtime measurement with the baseline. LKIM extends measurement to modules by introducing small modifications to the Linux kernel in order to provide triggering events for the measurement process. The module baseline is produced dynamically by computing the hash of the module text in memory from the module file on disk and the location in memory where the module is being loaded. The module file on disk is also hashed and recorded. When later measurements are performed, any operational structures introduced by the module will not cause a false failure of integrity.

BRIEF DESCRIPTION OF THE DRAWINGS

These and other objects, features and advantages of the invention will be apparent from a consideration of the following Detailed Description Of The Invention considered in conjunction with the drawing Figures, in which:

FIG. 1, comprising FIGS. 1(a)-1(d), illustrates four possible IMS layouts: 1(a) the MA shares the Target's execution environment and the DM is on a physically distinct host; 1(b) the MA runs on the same host as its target but is isolated using, e.g., dedicated hardware or virtualization and the DM remains on a physically separate host; 1(c) the MA, DM, and Target are each on a dedicated host; and 1(d) the MA and DM share a single host/execution environment and the Target runs on a dedicated host.

FIG. 6, comprising FIGS. 6(a) and 6(b), illustrate one embodiment of the LKIM invention: 6(a): architecture and dataflow and 6(b): example Measurement Data Template.

FIG. 7, comprising

DETAILED DESCRIPTION

Figure 2:
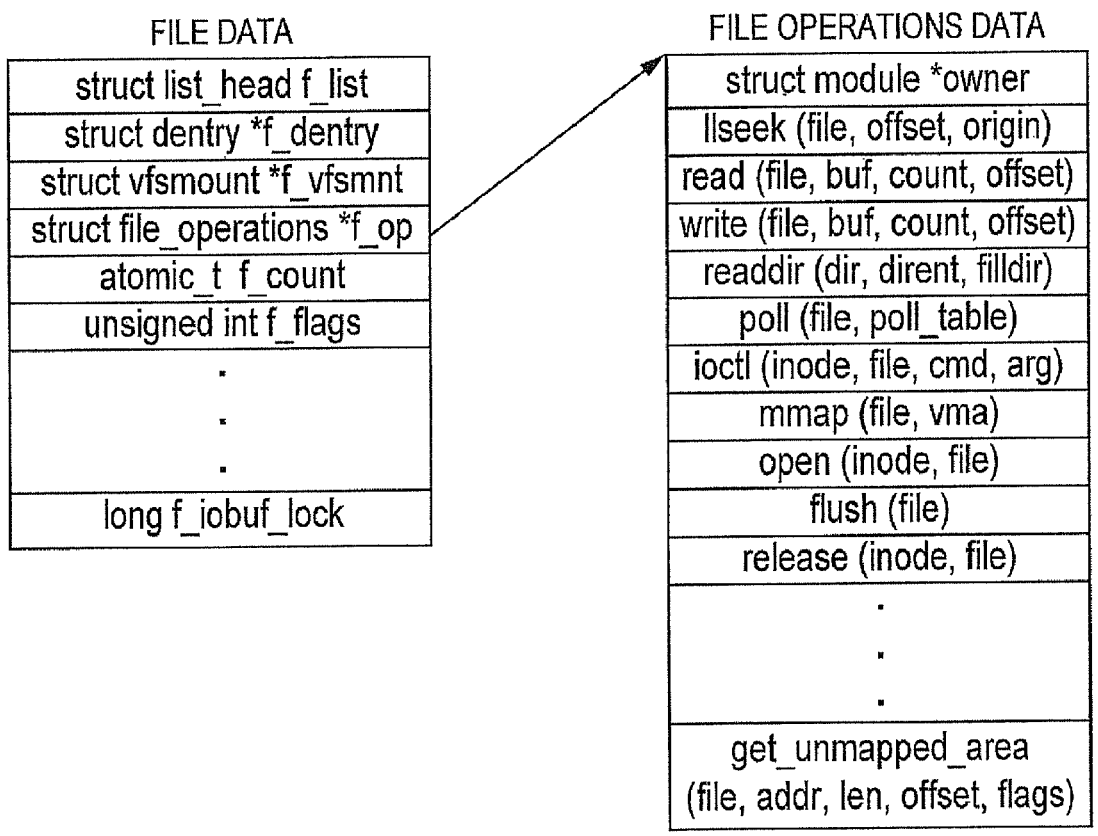
FIG. 2 illustrates a file data structure that includes the f_op field which points to a file_operations object. The file_operations data structure contains pointers to functions that operate on the file object.

The overall objective of the invention is to provide the ability to verify the integrity of a software-based computer system. In particular, the invention is a solution for measuring the integrity of an operating system's execution and ensuring that the system's code is performing its intended functionality. This includes examining the integrity of the code that the operating system is executing as well as the data that the operating system accesses. Note that the objective of the invention is not to provide a secure operating system or to prevent malicious behavior from occurring. Rather, it is, in one embodiment, to provide a measurement capability to detect unauthorized changes to code executing in Ring 0 (also known as kernel mode).

The integrity of the system's execution will be measured at boot time and may be measured subsequently, both on a periodic basis or in response to a request. Re-measuring the kernel's integrity is necessary due to the dynamic nature of the kernel's execution and the fact that the state of the kernel's data, and possibly even code, will change over time. Remote computer systems may retrieve the measurement results for a particular computer system and use those results to determine whether or not the system's integrity is intact. In this manner, a computer system may determine which remote systems it can trust and interact with. In some cases, a remote computer system may simply want to retrieve the most recent measurement results for a particular system rather than trigger a complete re-measurement of the kernel's integrity. Therefore, in addition to measuring the integrity of a system's execution, the invention is responsible for providing an attestation service that stores measurement results in a secure location. These results are then made available to remote systems.

In one embodiment, measurement of the integrity of a computer system is based on utilizing layers of trust. A first layer can be a set of hardware enhancements that allow programs to run in isolated execution environments by protecting memory, input/output, and other system resources from being accessed by other applications; an example of such enhancements is Intel's LaGrande Technology (LT). An LT-based platform includes a Trusted Platform Module (TPM), a device bound to the platform that provides a hardware-based mechanism for protecting access to cryptographic keys and other secret data. The TPM can be used to securely store system measurement results for attestations. In addition, LT provides hardware mechanisms for protecting the launch of a system's Domain Manager (DM), which in turn is responsible for launching separate domains for executing applications. In this way, LT provides a trusted hardware platform, or the "root of trust," on which the operating system and low-level code can run. Since LT ensures the integrity of the hardware, the hardware can then be used to measure the trustworthiness of the operating system running on top of it. Verifying the integrity of this operating system layer is the area of focus for the invention. The concept of using layers of trust can be extended all the way up to the application level; once the operating system can be trusted, it can be used to measure the integrity of higher level software components such as user processes and network communications.

The idea of building on increasing layers of trust can potentially be applied to the operating system itself. For example, if we can separate the operating system into clearly defined components and first measure the integrity of its most basic functions, then we can use those basic functions as building blocks for measuring additional components of the operating system which in turn can be trusted once they have been verified. This process can be repeated until the entire operating system has been measured and is trusted. This approach provides the benefit of using the functions provided by the operating system to measure itself, rather than having to re-write functionality such as loading a page from disk into memory. Separating an operating system into layers of trust can be an effective approach for a microkernel architecture, which defines a very small set of functions within the kernel, with other system processes such as memory allocators and system call handlers running on top of the microkernel. In contrast, the Linux kernel has a monolithic architecture, with data structures and functions that are highly interconnected with each other.

The technical approach herein for measuring the integrity of the Linux kernel focuses on examining the integrity of the kernel's execution path, since malicious code introduced into a kernel cannot cause harm unless it is executed. The measurement of the integrity of the kernel's execution path is broken down further into two components: measuring the integrity of the kernel's code and measuring the integrity of the kernel's data.

The "integrity" of the kernel code is defined as being intact if that code has been installed or approved by a system administrator or some trusted authority. Detecting bugs and security vulnerabilities inherent in the approved code is outside the scope of the invention; instead, the goal is to ensure that the code that is installed or approved by the system administrator is the only code that is allowed to execute. This is achieved by generating a cryptographic hash of the code for the kernel using the MD5 hash algorithm and comparing it against a securely stored "golden hash" which is generated from a trusted version of the kernel.

In addition to verifying the integrity of the kernel code, we want to ensure the integrity of kernel data structures or objects that may affect the kernel's execution path; for example, if an attacker is somehow able to change the address for a file object's f_op field which contains the address for its file operations, then future calls to the file's operations may result in the execution of arbitrary code instead of the standard kernel-defined file operations. Therefore, it is important to ensure that the data structures accessed by the kernel contain values that fall within a set of values that are acceptable and "approved" for that particular data structure.

Compared to measuring the integrity of the kernel code, measuring kernel data involves a larger problem space and poses some new challenges. Kernel data structures that are contiguous and whose values are not expected to change, such as the interrupt descriptor table and global descriptor table, can be hashed and measured in the same manner as the kernel code. However, most kernel data structures contain values that can change quite frequently and may or may not be correct depending on the overall state of the kernel. Measuring the integrity of the kernel data structures requires an understanding of how the data structures and individual fields within those data structures are used by the kernel. Furthermore, the Linux kernel can potentially use thousands of instances of data structures. Some data structures, such as task_struct and inode, can be accessed frequently in the course of normal kernel execution, while other data structures might be used less frequently or have a lesser impact on the kernel's execution path. Therefore, in order to effectively measure the integrity of the kernel's data, we must prioritize which data structures and fields are mostly likely to affect the kernel's execution. Table 1 below contains an outline of measured Linux kernel data structures.

TABLE 1

System call table
Checked system call dispatch table (sys_call_table) - 256 entries
Superblocks
Iterated through global list of superblocks (super_blocks)
Checked superblock operations (superblock->s_op)
Checked disk quota operations (superblock->dq_op)
Checked list of dirty inodes (superblock->s_dirty)
Checked inode operations
Checked files assigned to superblock (superblock->s_files)
Checked file operations
Inodes
Iterated through inode_in_use and inode_unused lists (all inodes will be stored in either these 2 lists or the list of dirty inodes associated with a superblock)
Checked inode operations (inode->i_op)
Checked default file operations (inode->i_fop)
Checked dentries assigned to inode (inode->i_dentry)
Checked dentry operations
Checked address_space assigned to inode (inode->i_mapping)
Checked address space operations
Files
Checked files in use - see superblock
Dentries
Memory regions (vm_operations_struct)
Iterated through list of memory descriptors starting with init_mm and looked at mm_struct->mmap field which contains a link of memory regions (vm_area_struct)
Checked memory region operations (vm_area_struct->vm_ops)
Address space
Block devices
Looked at hash table of list of block device descriptors (bdev_hashtable)
Checked the block device operations (block_device->bd_op)
END TABLE 1

In terms of determining which kernel data structures and fields can have a significant impact on the kernel's execution path, we have identified function pointers, system calls, and modules as primary areas of concern. Function pointers, such as the file operations field of the file object mentioned above, point to functions that operate on the parent object (see FIG. 2).

System calls are a special type of function pointer, and intercepting system calls is a common technique in compromising the Linux kernel. A brief search of the Web resulted in tutorials describing how to intercept system calls for hiding the existence of files, processes and modules, changing file permissions, and implementing backdoors in the Linux kernel. Modules play an important part in determining the integrity of the Linux kernel since they execute in kernel mode on behalf of a user process and can alter the contents of kernel data structures. Modules are often used to implement device drivers but can also be used to implement file systems, executable formats, network layers, and other higher-level components in the Linux kernel. The ability to load modules into the Linux kernel provides a useful way for both measuring the kernel's integrity and introducing malicious code into the kernel. Modules introduce some additional considerations when measuring the integrity of the kernel's data structures; these are described in more detail below.

The measurement capability of the invention has, in one embodiment, been implemented as a Linux kernel module, although in the future the measurement code may run on an LT-based platform. The module verifies the execution of the Linux kernel running on a standard Intel x86 computer. For the purposes of implementing a prototype, the integrity of the Linux kernel version 2.4.18 was measured; however, the general concepts used herein to measure the Linux kernel can be applied to other versions of Linux, other Unix variants, and potentially to other operating systems. It is assumed that the measurement code, along with the golden hash and the set of approved values for kernel data structures, will be stored in a secure location, such as the one provided by the TPM.

Figure 3:
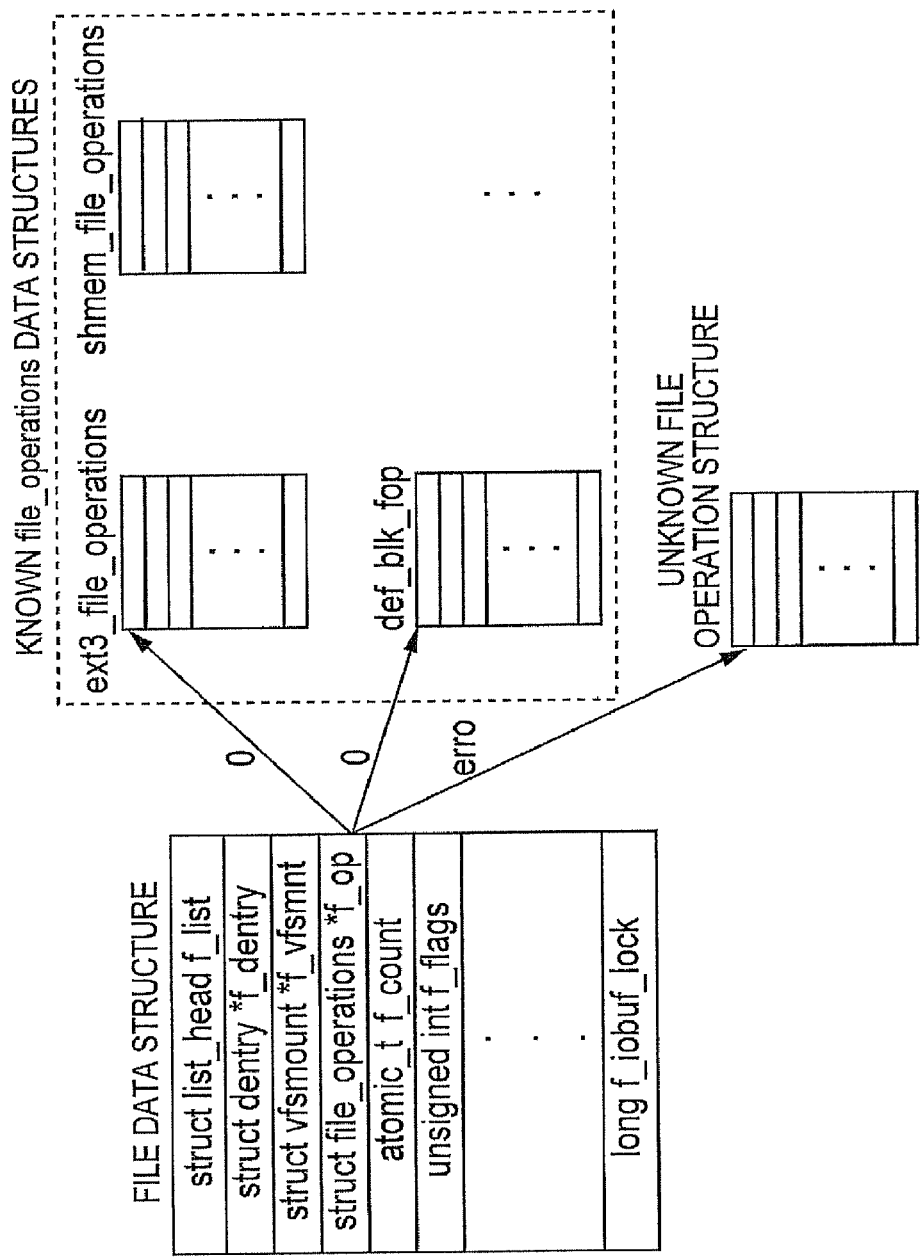
FIG. 3 illustrates that for a given file object, the measurement module checks its f_op field to see if it contains the address for a known file operations structure.

In addition to implementing the measurement capability as a module, we also needed to instrument the Linux kernel itself in order to support the ability to update the "approved" set of values for kernel data structures. In order to compare the values of kernel data structures against a set of approved values, we first needed to determine what the set of approved values were for a particular data structure. For example, the f_op field of an file object should only point to file operation structures defined in the Linux kernel, such as ext3_file_operations or shmem_file_operations, or to file operation structures defined in an approved loaded module (see FIG. 3).

Since we know that the Linux kernel in its original state cannot make any changes to its own code during runtime, the only legitimate way to add new code and new approved values for kernel data structures is through modules. Therefore, in order to detect when a loaded module has introduced new approved values for data structures, we added "trigger points" throughout the kernel to trigger re-measurements of the kernel whenever a module is loaded, unloaded, or when a module operation has been called. These triggered measurements occur immediately before and after a potential kernel change; the first measurement is necessary to verify the kernel's integrity before any new changes are introduced, and the second measurement is necessary to determine whether or not the list of approved values for kernel data structures should be updated. In this way, authorized changes that occur at expected points in the kernel's execution are recognized and accounted for while unauthorized changes to the kernel will be detected the next time it is measured.

Unauthorized changes to the kernel that can be detected using the strategy outlined above include:

Modules that are loaded into the kernel but bypass the insmod user process;

Changes to the system call table made by entities other than approved modules;

Alterations kernel execution via changes to function pointers; and

Any changes to the kernel and module code.

Unauthorized changes to the kernel that would not be detected include:

Changes to the kernel that take place between measurements in which the kernel is restored to its previous state before the next measurement; and Changes to data that do not result in a change in the kernel's execution content or execution path; new function pointers may be introduced, but they are not called anywhere in the kernel and therefore will not be executed.

While as noted, detecting bugs and security vulnerabilities inherent in the approved kernel code is outside the scope of this project, if an attacker were to exploit an existing security vulnerability to gain access to the kernel and change its code or certain data structures, those changes would be detected.

The Linux kernel in its original state should not be able to modify any of its own code during execution. However, loaded modules have the potential of modifying kernel code and data and are a means for updating kernel functionality without having to re-compile the kernel. The code and data structures introduced by a loaded module can have a significant impact on the kernel's execution path; for example, a module may introduce a new system call handler function that replaces the one normally executed by the kernel. Therefore, we want to ensure that only modules approved by a system administrator or some trusted authority are allowed to be linked to the Linux kernel.

In order for modules to be loaded into the kernel, they must be accompanied with a registration "form" that is filled out and signed by a system administrator. The form includes a golden hash of the module's code as well as a list of changes that the module is allowed to make. These changes could include making changes to the system call table or interrupt descriptor table or updating function pointers (for example, pointing them to a new inode operations structure for a new file system). Whenever a module performs an allowed change, the system will be re-measured and the set of approved values will be updated to accept any new values that have been set by the module. If a module performs a change that is not allowed, the change will be detected the next time the system is measured.

Another consideration with loading approved modules is the need to ensure that the module that was approved is the same as the module that has been loaded into the kernel. The hash of the module stored in the registration form is generated while the module is still stored on disk, before it has been loaded into the kernel. We cannot compare the hash of the module stored on disk against the hash of the module loaded in memory since they will not match. Furthermore, we cannot even compare against a golden hash of the module previously loaded in memory because the hash of the module will vary depending on the order in which it was loaded with other modules. However, if we first measure the integrity of the kernel as well as the insmod user process which is responsible for linking the module into the kernel, then we can be reasonably certain that the approved module was properly loaded into the kernel.

Figure 4:
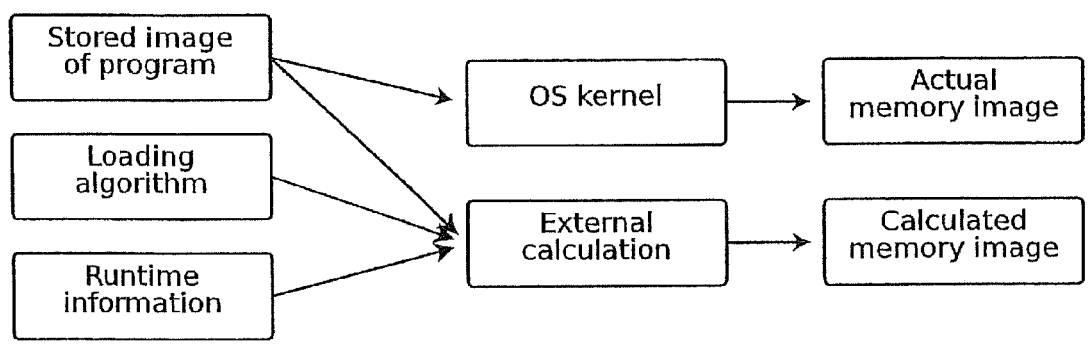
FIG. 4 illustrates the process for measuring dynamically loaded program code.

As a program is loaded from a stored location into memory, it may be altered based on information that is only available at runtime, such as the address in memory to which it is being loaded. The invention, in another embodiment, reproduces the memory image of the program, given the stored image, the relevant runtime information, and knowledge of how the program will be loaded into memory. It does not rely on an operating system kernel or any other mechanism to load it properly, since it mimics the process externally. An external entity can then compare the in-memory image of the program to the calculated image, and determine whether the in-memory image has been corrupted. This is illustrated in FIG. 4.

In the Linux kernel, there are two parts of executable kernel code that may change when loaded into memory: the text of any kernel modules that the kernel loads, and the text of the kernel itself. Loadable modules, which the kernel loads after it boots, contain "relocation" sections that describe how to alter the module's text depending on the where in memory the kernel loads it. The notification process the Linux kernel uses when it loads or unloads a module has been modified. When a module is loaded, the kernel notifies some entity (e.g., a user-space process or a process in another virtual machine) that a module is being loaded, and indicates which module it is loading and where in memory it is loading it. This is sufficient information for the external entity to reproduce the in-memory image of the kernel module.

Unlike most executable programs, the Linux kernel itself contains only absolute addresses, and thus does not need to be relocated. However, the Linux kernel provides for the opportunity to replace individual program instructions based on bugs or extra capabilities in the currently executing processor. Information detailing which instructions to replace and how to replace them is stored in the ".altinstructions" section of any program, including in the kernel. The kernel applies these changes to itself early in the boot process, and it applies them to any program it loads, including kernel modules. The ".altinstructions" information is contained inside the stored image of a program, and for the invention to work, it is required to know which features of the processor cause the kernel to apply .altinstructions.

The Linux kernel makes similar alterations to itself and to programs it loads to adjust for computers with multiple processors. The same technique described above applies in this scenario as well.

Representation of integrity measurement data as a measurement graph provides a direct reflection of a processes internal object graph for analysis by a challenger. Measurement graphs decompose a single complex measurement into several distinct measurement classes. Each measurement class represents a semantically related grouping of variables which have been examined to produce a characterization of some isolated subsystem of the targets state. Connected to each measurement class is a structured representation of the measurement of those objects which contribute to the overall measurement of that class. This representation is derived from the measurement target's in memory object graph and indicates not only the measurements of atomic objects, but also the way in which these low level objects are connected into compound structures. For transmission, the Measurement Graph can be encoded using a descriptive markup language which supports cross references (e.g., XML), as entries in a relational database, or in any other format for encoding directional graphs with valued nodes.

By inspecting the measurement graph, a challenger may determine the answers to questions concerning not only the values of certain key structures, but also the linkages between interesting components. For example the challenger may determine if the statement "for all instances, I, of structure X, if I references the object O, then I also references the object M" is true.

Figure 5:
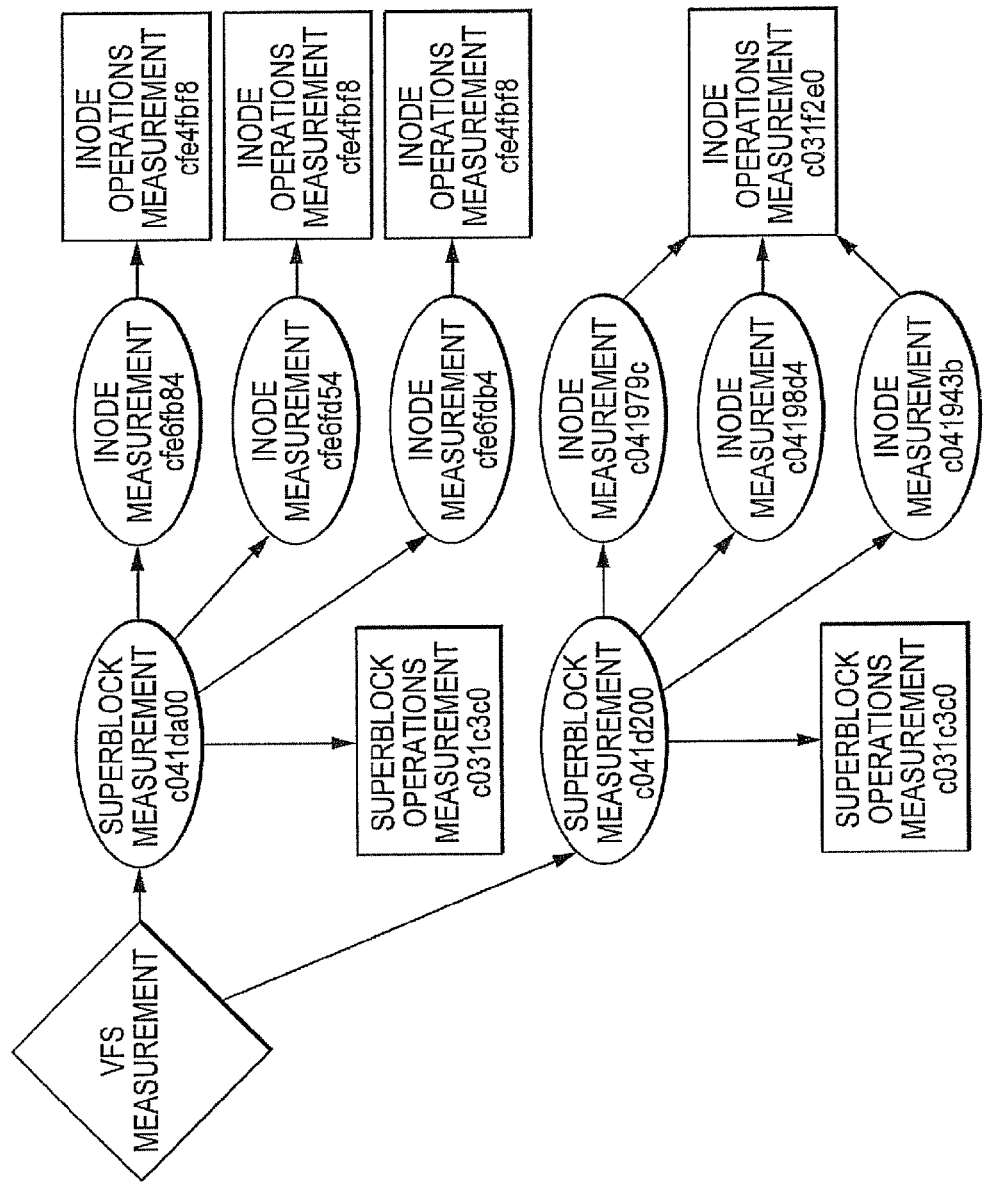
FIG. 5 is a diagram depicting a portion of the measurement graph for the VFS.

For example, a measurement of the Linux Kernel's process image may include a traversal of structures in the virtual file system (VFS). In the VFS, super block structures reference lists of inodes. All of these structures also reference tables containing function pointers for file system specific implementations of standard file related operations (such as open, close, read, write, etc). A portion of the measurement graph for the VFS is depicted in the diagram in FIG. 5. Here, the VFS is a measurement class which includes measurements of two different super blocks. Each super block measurement comprises a measurement of its operations table, and measurements of each inode referenced by that super block. Similarly inode measurements are composed of a measurement of their operations tables, and may also include measurements of other substructures such as files or dentrys. The values of the terminal measurements (those of the tables of function pointers) would likely be the actual values of each function pointer in the table.

For transmission to a challenger, one could encode this measurement graph as an XML document similar to:

```
<MeasurementClass name="VFS">
    <CompoundMeasurement type="superblock" id="c041da00">
        <TerminalMeasurement type="super_ops" id="c031c3c0">
            c017c3fb, c017c506, c017c3c0, 0, 0,0 c016869b, c017c525, 0,
            0, 0, 0, 0, c016f525, c017c491, 0, 0, 0, 0, 0
        </TerminalMeasurement>
        <Compound Measurement type="inode" id="cfe6fb84">
            <TerminalMeasurement type="inode_ops" id="3">
                c014ad4c, c01700ec, c014a732, c014a7d5, c014c769,
                c014ad13, c014a92a, c014ac5f, c014a85e, 0, 0, 0, 0, 0,
                0, 0, 0, 0, 0, 0
            </TerminalMeasurement>
        </CompoundMeasurement>
        ...
    </CompoundMeasurement>
    <CompoundMeasurement type="superblock" id="c041d200">
        <TerminalMeasurement type="super_ops" id="c031c3c0">
            c017c3fb, c017506, c017c3c0, 0, 0, 0, c016869b, c017c525, 0,
            0, 0, 0, 0, c016f525, c017c491, 0, 0, 0, 0, 0
        </TerminalMeasurement>
        <Compound Measurement type="inode" id="c041979c">
            <TerminalMeasurement type="inode_ops" id="c031f2e0">
                c01ceb76, c01700ec, c016fcda, c016f5ef, c01ceba2,
                c01ceb3d, c016f643, c01cea93, c016f684, 0, 0, 0, 0, 0,
                0, 0, 0, 0, 0, 0
            </TerminalMeasurement>
        </CompoundMeasurement>
        <Compound Measurement type="inode" id="c04198d4">
            <MeasurementRef id="c031f2e0" />
        </CompoundMeasurement>
        ...
    </CompoundMeasurement>
</MeasurementClass>
```

This encoding allows the challenger to recreate the original measurement graph structure, which can then be analyzed for compliance with certain expected properties. A simple example may be that the operations tables should all be identical to tables listed in a predefined set of expected values. A more involved criteria may be that all of the inodes referenced by a super block with operations table c031c3c0 should reference the inode operations table c041979c.

In another embodiment of the invention, the Linux Kernel Integrity Monitor (LKIM) serves as a measurement agent (MA) for a new general purpose IMS designed to support many different measurement scenarios. The system is capable of selecting from an extensible set of attestation scenarios governed by a system policy, taking into account requirements for security and privacy. In performing particular attestations, this IMS is capable of selecting appropriate measurement techniques by initiating appropriate MAs.

LKIM was designed for a complex IMS environment and is intended to meet the needs of several measurement scenarios. The measurement properties have greatly influenced LKIM's design. Although LKIM's implementation is specific to measuring the Linux kernel, the techniques it employs are general and will apply equally well to other operating systems and complex software systems needing measurement. This technique has been applied to the Xen (P. Barham, B. Dragovic, et al., Xen and the art of virtualization, Proceedings of the Nineteenth ACM Symposium on Operating Systems Principles, pages 164-177, 2003) hypervisor.

LKIM uses contextual inspection to more completely characterize the Linux kernel. It produces detailed records of the state of security relevant structures within the Linux kernel, and can easily be extended to include additional structures. LKIM cannot only produce measurements at system boot time but also in response to system events or demand from the IMS. Measurement data is stored in a useful format that allows an IMS to retrieve any or all of the raw data. The IMS can use the data, or any transformation on any portion it, according to the requirements of particular measurement scenarios and under the control of system policy.

Figure 6A:
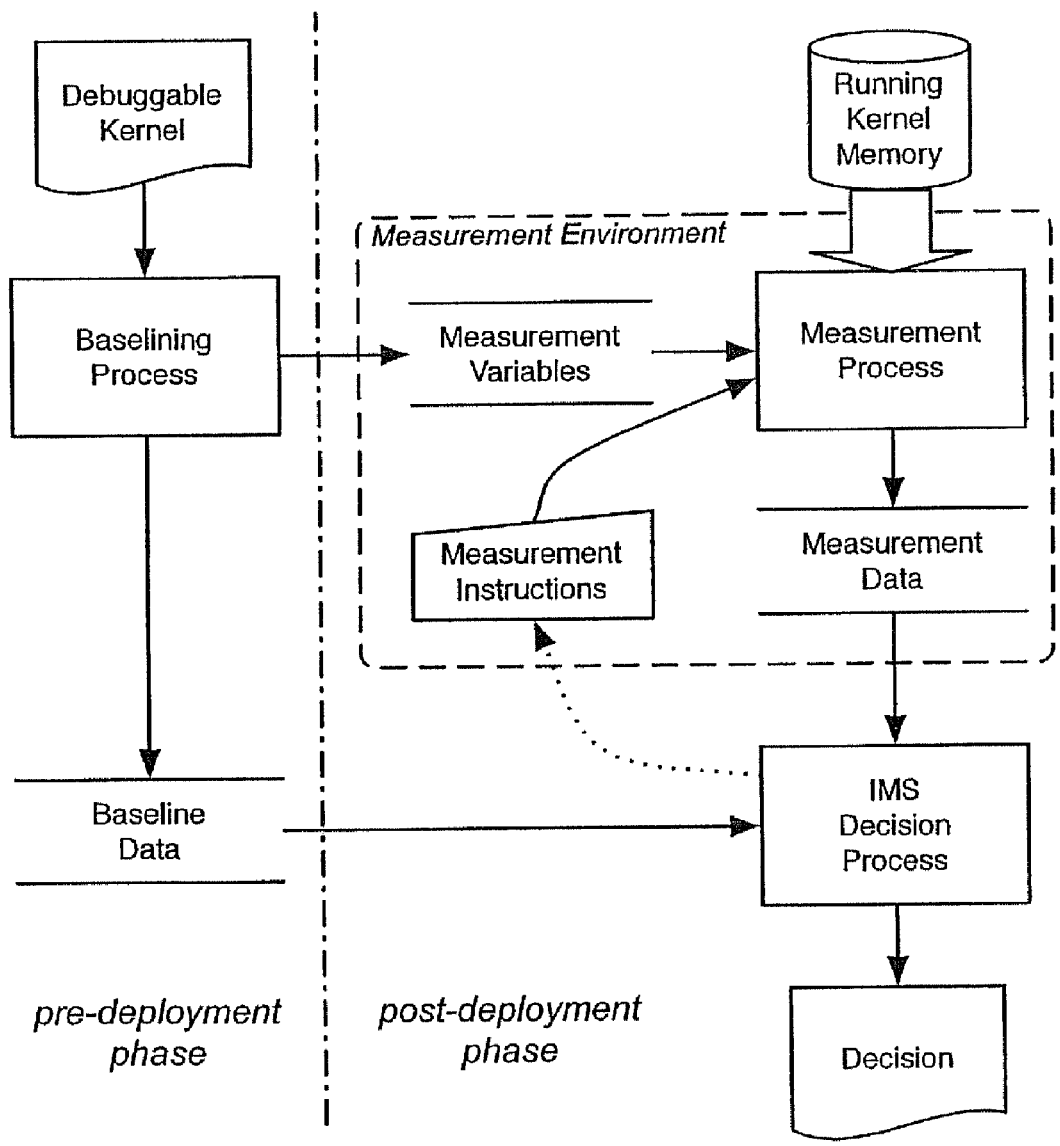

A simplified view of LKIM's architecture is depicted in FIG. 6(a). LKIM has been developed to support two deployment scenarios: Native and Xen. There are significant differences in the measurement inspection mechanisms for each case. In the native scenario, LKIM is a user process within the target space and access to kernel memory is through /dev/kmem. On Xen, LKIM runs in a Xen domain distinct from the target's domain. The Xen hypervisor maps the target kernel's memory into the address space of LKIM's domain.

LKIM measures the Linux kernel using contextual inspection, striving for maximal completeness. This technique attempts to overcome many of the limitations of hash-based measurements, specifically the inability of hash-based measurements to useably identify systems with a large number of expected states and the inflexibility of the results generated by a hash-based system. Inspection uses detailed information about the layout of key data structures to traverse portions of a running process' object graph. This traversal is used to produce a detailed report which describes the structure of the explored subsystems and the current state of identifying variables within those systems.

Contextual inspection is a powerful technique that enables measurement systems to achieve better completeness than would be possible with hashing alone. It produces rich results that can reflect unpredictable structures. However, this richness of detail typically leads to a substantial increase in the size of the results produced, which may be far less usable than a hash-based measurement of a system that could have been effectively measured by either technique. A combination of hashing and contextual inspection allows measurement systems to locate and succinctly identify attributes of targets. The results can represent the structural information gathered by the contextual inspection portion of the system and the concise fingerprints generated by hashing. This combination requires more processing than a single hash of a system with only a few possible states, but results can be analyzed by a challenger in a reasonable period of time.

LKIM combines traditional hash-based measurement with contextual inspection. It uses contextual inspection to provide identifying measurements of the execution path of a running Linux kernel. It not only hashes static regions of the kernel such as its text section, system call table, interrupt descriptor table (IDT), and global descriptor table (GDT) but also traverses relevant portions of the target's object graph and the layout of various kernel structures. This traversal produces evidence that indicates the location referenced by function pointers stored in dynamic data structures and the context in which they were detected. This allows a challenger to verify not only that the execution path is entirely within the hashed text section but also to perform sanity checking based on expected groupings of function pointers.

LKIM breaks up the measurement process into a series of discrete measurements according to a set of measurement variables. These variables identify those portions of the target that LKIM can individually inspect. They are arranged hierarchically to enable LKIM to perform increasingly complete measurements of each piece of the kernel that LKIM is able to measure.

LKIM is governed by a set of measurement instructions indicating which measurement variables are of interest during a given run. A local configuration file defines the measurement instructions, giving the address and type information of top-level measurement variables. Alternatively, LKIM can receive its measurement instructions directly from an IMS. This greatly enhances the flexibility of the IMS by enabling it to selectively vary the measurement data produced according to the requirements of a particular attestation scenario.

Measurement variables are grouped into measurement classes, each a vertical slice of the measurement variable hierarchy with successive levels providing LKIM with additional contextual information for measuring a particular part of the kernel. Top-level variables are just starting points from which many kernel variables will be examined. To measure a portion of the kernel, LKIM uses the corresponding top-level variable to find the appropriate location in its target's address space. According to the specific technique associated with the variable, LKIM then performs the measurement, recording any relevant properties detected. As prescribed by the measurement instructions, measurement proceeds recursively with increasingly lower levels of the class being inspected until the indicated degree of completeness is attained.

For example, a measurement class for the Linux Virtual File System(VFS) has been defined to include the following measurement variables: inode in use, inode unused, and super blocks. Each of these variables reference linked lists in the kernel containing the state of inodes dynamically created by the kernel. LKIM is capable of measuring the state kept in each list, including tracing the pointers to VFS operations associated with each inode. LKIM's configuration file might include instructions to measure the VFS class, with the three measurement variables in it being used to select the exact portions of the VFS subsystem to be measured. Whenever LKIM runs, the data will include information about the linked lists referenced by the variables.

LKIM supports other measurement classes to selectively measure Linux. Included are classes for static portions like the kernel text and system call table, as well as dynamic portions like the executable file format handlers, the Linux Security Module (LSM) hooks, and parts of the block IO and networking subsystems. Parts of the kernel can be precisely measured with techniques such as hashing. In others, imprecise heuristics are the best known technique. Because LKIM uses measurement variables to control its operation, different measurement techniques can be assigned to different measurement variables. This enables each portion of the kernel to be measured using the most appropriate technique, yielding the best potential for completeness.

Although the total set of measurement variables that LKIM understands does not provide complete coverage of the Linux kernel, LKIM can easily be extended to measure additional portions of the kernel. Where existing measurement techniques are appropriate, new measurement classes and/or variables simply need to be defined and included in measurement instructions. As new or improved techniques are developed and incorporated into LKIM, measurement variables can be redefined to enhance measurement data quality or new variables can be defined to augment the data already collected.

Baselining capabilities were introducing into LKIM to supplement contextual inspection. Baselines are generated to create the structure definitions that indicate how LKIM handles the measurement process for particular measurement variables. Baselines can also be used by an IMS decision process to help validate measurements provided in an attestation. FIG. 6(a) also shows the baselining process. There are two forms of baselining in LKIM: static and extensible.

Static baselining enables LKIM to generate baseline measurements using the on-disk ELF image of the target kernel.

LKIM parses standard DWARF debugging information that can be generated at compile time (Tool Interface Standards Committee, DWARF Debugging Information Format Specification v2.0, May 1995, and Tool Interface Standards Committee, Executable and Linking Format (ELF), v1.2 edition, May 1995), yielding the necessary data to associate regions of memory with particular structure types. LKIM can then decode and measure variables initialized at compile time. Although not all relevant structures can be baselined in this way, many common subversions infect structures such as file or inode operations tables (J. Levine, J. Grizzard, and H. Owen, Detecting and categorizing kernel-level rootkits to aid future detection, IEEE Security and Privacy, 2006) which are typically initialized at compile time.

Static baselining addresses a major problem of runtime measurement systems; performing baseline measurements of a running image may not yield a representation of the true expected configuration. The image may already have been subverted when the baseline is performed. This problem is specifically identified in (N. Petroni, Jr., T. Fraser, et al. Copilot—a coprocessor-based kernel runtime integrity monitor. Proceedings of the 13th Usenix Security Symposium, pages 179-194, August 2004) as a major shortcoming. Because LKIM uses a static baseline that is generated off-line in a safe environment, a system owner can be confident that integrity decisions using the baseline will be made relying on an accurate notion of the expected configuration. The dynamic nature of target systems makes static baselining insufficient. Extensible baselines solve this problem. When a change in the target is detected, the system can be re-baselined, changing the measurement instructions used by LKIM as necessary. The updated baseline could be propagated to any relevant decision process, optionally allowing it to update its behavior.

Linux Kernel modules are difficult to accurately measure because they are relocated at load time. Hashing is unsuitable for modules because hash values will only be predictable for the original module image and not the relocated version that will execute. Addresses of key data structures cannot be known until relocation. For example, modules are commonly used to support additional file system types. Such modules include tables containing pointers to functions that provide file system-specific implementations of standard operations like read and write. Addresses of these functions are unpredictable because they depend on the relocation.

Linux has been modified to notify LKIM whenever modules are loaded or unloaded, making the module's name and address of each section available. On module load events, LKIM uses this information to simulate the loading process on a copy of the module. LKIM extends the current baseline file with data acquired by inspecting the module and adds directives to the measurement instructions to cause the module's data to be re-measured when handling subsequent measurement requests. On module unload events, LKIM reverses the changes.

It is not possible for LKIM's module handling capabilities to achieve complete measurements because there is no mechanism by which LKIM is able to generate a complete and reliable characterization of all modules which are or have been loaded into the kernel. This is not an issue for persistent components of the module such as its primary text section and global data because these sections are located by LKIM and added to the measurement instructions for future measurement requests. However, loadable modules may specify an initialization section which is executed at load time and then released. Such ephemeral module sections may introduce changes to the kernel which would not be connected to the modules main text body or the rest of the kernel's object graph. If measurement is not synchronized to module loading, the initialization section will go unmeasured.

Unfortunately, it is difficult to ascertain exactly which module is being loaded because the cooperation of the measured kernel would be required. Clearly, the kernel's notification could be instrumented to additionally provide a hash of the on-disk image of the module. Careful reasoning must be applied to verify either that the measured kernel cannot be lying and thus the hash must really correspond to the module being loaded, or that the measured kernel can only lie in a way that will be detected by later measurements. An alternate scheme may be to force the kernel to consult a trusted module server or validator before it is able to load a new module. This approach would require a similar argument to be made which ensures that the kernel is unable to surreptitiously bypass the new component when loading modules.

Remeasurement for an IMS is a means to help achieve freshness of measurement data. LKIM supports measurement of a running Linux kernel on demand. Remeasurement is simply achieved by running LKIM again. Remeasurement might be necessary as a response to requests from an IMS trying to satisfy the freshness requirements of some attestation scenario. As an example where this might be useful, consider a requirement that measurement data be produced within a certain time period prior to attestation. The IMS can satisfy that scenario by requesting that LKIM produce fresh measurements prior to responding to the attestation request.

LKIM's design also has provisions to attempt to identify conditions which will cause the most recent measurement data collected to no longer reflect the current state of the system, and hence limit the effectiveness of future integrity decisions based on that data. By recognizing such conditions LKIM would be able to anticipate that a remeasurement is necessary prior to being asked by the IMS. LKIM has been designed to respond to external events such as timers indicating that the measurement data is stale and a remeasurement needs to be scheduled. The design also allows for the possibility that the target system be instrumented with triggers that will allow a cooperating operating system to notify LKIM that some known event has occurred that will invalidate some or all of the most recent measurement data. Although triggers are useful to reduce response times to requests for measurement data, they are not necessary for correct operation, and LKIM still works when it is not possible to modify the system. To date, the only triggers that have been implemented in LKIM are those that indicate a change in the set of loaded kernel modules. However, the triggering mechanism is present, making it straightforward to add additional triggers as needed.

LKIM was designed for flexibility and usability in the way that data is collected and subsequently reported. It achieves this through its Measurement Data Template (MDT). Whenever LKIM runs, collected raw measurement data is stored in the MDT. The MDT has been custom-designed for the target system to enable LKIM to store enough data to meet the maximum possible requirements for completeness. The MDT is formatted to add meaningful structure to measurement data. LKIM stores measurements for different parts of the systems in whatever way is appropriate for the measurement technique being used for that part of the system. If a hash is suitable for one section, the MDT would contain the hash value at the appropriate location. If some section warrants a more complex measurement strategy, the corresponding section of the MDT would contain whatever data was produced. As new measurement strategies are developed making more complete measurements possible, it is a simple matter to extend the definition of the MDT to allow the new form of measurement data to be reflected in the results.

FIG. 6(b) shows a partial MDT customized for Linux and rendered in HTML. The data are hierarchically arranged by measurement class as prescribed in the measurement instructions, forming a tree from a specified top level variable to the leaf object of concern (e.g., a function pointer). The MDT is stored in XML. It contains hashes of the static regions and detailed information regarding which collections of function pointers are active in the kernel, how many objects reference those collections, and the target address of each function pointer.

LKIM's use of the MDT supports flexibility and usability in the way measurement data can be reported. Since the different portions of the MDT characterize only pieces of the entire system, LKIM is able to support varying degrees of completeness requirements by selectively reporting those portions of the MDT as required by the IMS. Reporting can be customized for different scenarios to report all of the data or only the portions required. It is possible to customize even further by reporting functions of all or part of the MDT. This can be useful in situations like one where only a hash of the MDT was deemed necessary by the IMS. The degree of flexibility made possible by the MDT would be very difficult to achieve using a system that only captures a single measurement result for the entire system.

The use of the MDT also supports freshness. When remeasurement is necessary, only those portions of the MDT for which the IMS needs fresher measurements need to be recalculated. This should reduce the impact of remeasurement by not performing wasteful remeasurements on portions of the system.

LKIM's use of an MDT enhances an IMS's ability to meet privacy requirements. When measurement produces data that should not be released in all attestation scenarios, an IMS can dynamically filter the MDT depending on the concerns of the current scenario. Using a MDT supports privacy by enabling an IMS to allow sensitive portions of the measurement data to be sent to trusted third parties so that they may perform the attestations to entities that are not entitled to see the private data. This has the secondary benefit of relieving the burden of integrity decisions at the systems that initiated attestations by allowing specialized systems to be used.

This hierarchical structure of the MDT allows selective reporting of measurement data on any or all of the kernel subsystems. The MDT includes freshness information in the form of time stamps. Depending on the completeness requirements for the current situation, LKIM can select different portions of the data, pruning the tree as required. Remeasurement can be selectively performed on sections as needed. For example, a simple scenario may require only the hash of the kernel text, but from the same MDT, more complex scenarios can also be supported. Along with the kernel text's hash, a report on function pointers might be required so that it can be verified that all function pointers refer to locations in the text section and that are represented in the baseline. As an even more complex scenario, the report might require additional information about function pointer groupings (i.e. pointers stored in the same structure) so that it can be determined that they are similarly represented in the baseline. Using the MDT, LKIM is able to support each of these scenarios without modification.

To investigate the feasibility of contextual inspection, LKIM was initially implemented as a Linux kernel module. It executed out of the same address space as the target Linux system, using the kernel to report the measurement results. Although this initial system produced encouraging results with respect to completeness and freshness, there was a noticeable impact to the target kernel. To address this, LKIM was moved into a user-space process, accessing kernel data through the /dev/kmem interface. Moving to the richer user-space environment had the additional benefit of enabling LKIM's data reporting to be enhanced.

Although LKIM could be deployed like this today, it is not recommended. There is no way to protect LKIM from Linux. In fact, Linux must cooperate with LKIM if any measurement data is going to be produced at all, as the LKIM process is totally dependent on Linux for all resources that it requires. The quality of the data collected will always be questionable since Linux would be free to misrepresent true kernel state to LKIM.

To address protection concerns, LKIM was ported to the Xen hypervisor. The Xen architecture allows functionality to be isolated in virtual machines (VM). LKIM was placed in a separate VM from the target Linux system and uses Xen memory mapping functionality to gain the necessary access for measurement. By separating LKIM in this way, LKIM's operation can be protected from Linux, allowing it to perform its measurements and store results without fear of interference from Linux.

This approach succeeds in removing the measurement system from the direct control of the target operating system. However, more is required. With LKIM running in a separate Xen VM, an ability to produce measurements about LKIM and the Xen hypervisor might be necessary to satisfy completeness requirements. Linking all measurements to a hardware root of trust using a TPM could also be required. An IMS designed to use LKIM running in a VM should address these issues.

The contextual inspection approach used by LKIM comes at a significant cost in terms of impact on the target and complexity for the decision process. However, the gains in flexibility and completeness can justify this expense. Especially if the target is vulnerable to compromises that cannot be detected by hashing. This is the value proposition for LKIM.

The ability to detect rootkits that only infect dynamic data has been demonstrated by LKIM. Detecting modifications to the kernel text area and static data areas can be accomplished with a hash. However, the adore-ng rootkit targets the Linux Virtual File System (VFS) data structures that are dynamically created in kernel data (J. Levine, J. Grizzard, and H. Owen, Detecting and categorizing kernel-level rootkits to aid future detection, IEEE Security and Privacy, 2006). It redirects the reference to file system operations on the /proc file system to new operations introduced by the module. By traversing the list of active Modes, LKIM reports the existence of the reference to the adore-ng code. A verification check with the baseline of allowable operations then detects its existence. This allows a challenger to detect many redirection attacks by comparing the measurement of a running system to a baseline generated from the static image of an approved kernel.

Performance considerations of an integrity measurement system design include the impact on target performance, the response of the measurement agent to requests for measurement data, and the time it takes the decision maker to process measurement data. The initial analysis of LKIM's performance focuses only on the first two concerns. Since the measurement agent and the target operating system share computing resources, reducing the impact on the target may come at the cost of a longer response to measurement requests and vice versa. This assumes that the number of data structures inspected is the same, however the workload of the target operating system determines the number of data structures LKIM inspects.

Testing was performed using a standard desktop platform and two simulated workloads. The same hardware platform (Hardware: Dell Optiplex GX400 w/1 GB of RAM) was used for both Xen and Native configurations. (Xen config: two 2.6.16.13-xenUkernelseachw/256MRAM. Native config: a standard Linux 2.6.16.13kernelw/256MRAM.) Resource contention between LKIM and the target workload is managed by a scheduler and consequently the measurement duration is determined by priority given to the measurement agent; default scheduling algorithms were used in both configurations. Target kernel workloads were simulated by the Webstone benchmark and a build of the Linux kernel. Webstone (Mindcraft, Inc., http://www.mindcraft.com, WebStone 2.x Benchmark Description) performs mostly I/O processing and the number of measurement variables is a function of the number of clients hitting the web server. The kernel build workload provides a combination of I/O and CPU utilization while creating a large number of variables for LKIM to measure. In all cases, the set of measurement instructions included the full set of classes described above.

Figure 7A:
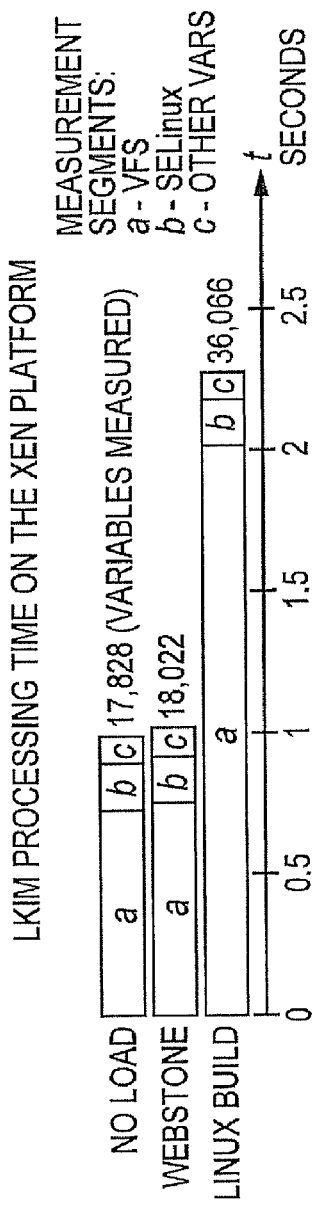
FIGS. 7(a) and 7(b), illustrate two LKIM performance perspectives: 7(a): processing timeline and 7(b): impact on target.

FIG. 7(a) shows the processing timeline for LKIM under each workload configuration. Using the Xen control mechanisms, LKIM is able to suspend the target during measurement; the timeline shown represents LKIM processing during peak activity for each workload. Without any workload on the target kernel, LKIM takes just under 1 second to inspect nearly 18,000 kernel variables. Inspection of VFS accounts for the majority of this time, with SELinux and other variable inspections taking approximately 260 ms. Under Webstone, the number of variables increases only slightly, but with Linux build the number increases to just over 36,000 variables. In each case, the increase in variables is due to an increase in dynamically created data structures within VFS.

Figure 7B:
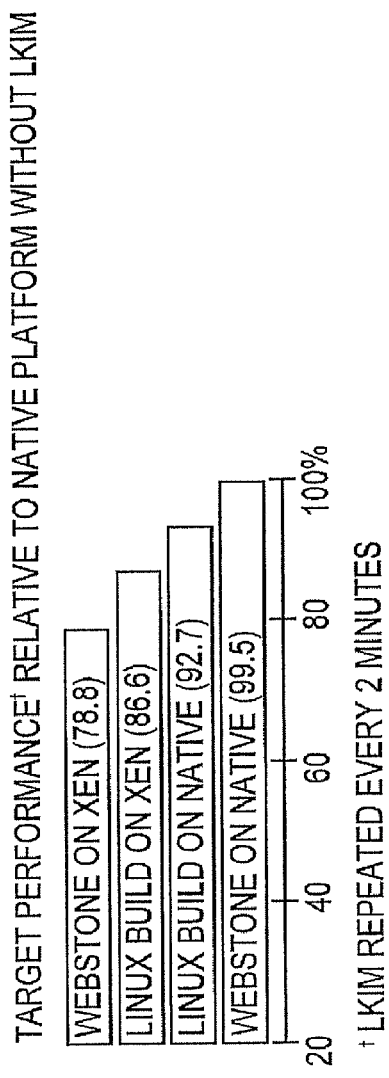

The impact of measurement on the target kernel can be regulated by adjusting the measurement frequency. FIG. 7(b) shows how target performance is affected by LKIM processing with the measurement Interval fixed at 2 minutes. For each workload, the relative performance is shown for both Native and Xen configurations.

The performance results show where improvements in efficiency would make the best gains for the Xen architecture. The biggest improvement would be to reduce the number of variables measured. Currently, LKIM assumes all objects need to be inspected for each measurement run. A better approach would be to recognized which objects have been modified and only measure those. Xen provides a way to detect which pages have been dirtied by the target but the largest set of objects, the VFS nodes, are in a linked list. A more sophisticated algorithm would be needed to locate only the entries that have changed.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for constructing a graph from data representing an integrity measurement of a running computer program, the method comprising the steps of:
   decomposing the integrity measurement, using a microprocessor, into a plurality of distinct measurement classes, each measurement class representing a semantically related grouping of measurement variables which have been examined to produce a characterization of an isolated subset of a measurement target's state, the measurement variables identifying portions of a kernel of the computer program that are inspectable; and
   connecting to each measurement class, using a microprocessor, a structured representation of the measurement of those measurement variables which contribute to the overall measurement of that class,
   wherein the structured representation is hierarchically organized to enable successive levels within the structured representation to provide contextual information to be employed for examining increasingly lower levels of classes until an indicated degree of completeness of examination is attained.

2. The method according to claim 1, the connecting step comprising the step of deriving the structured representation from the measurement target's in memory associations among the examined variables.

3. A machine for graphing data representing an integrity measurement of a running computer program comprising:
   a microprocessor coupled to a memory;
   wherein the microprocessor is programmed to construct a graph of the data by:
   decomposing the integrity measurement into a plurality of distinct measurement classes, each measurement class representing a semantically related grouping of measurement variables which have been examined to produce a characterization of an isolated subset of the running computer program's state, the measurement variables identifying portions of a kernel of the computer program that are inspectable; and
   connecting to each measurement class a structured representation of the measurement of those measurement variables derived from the measurement target's in memory object graph which contribute to the overall measurement of that class,
   wherein the structured representation is hierarchically organized to enable successive levels within the structured representation to provide contextual information to be employed for examining increasingly lower levels of classes until an indicated degree of completeness of examination is attained.

* * * * *